United States Patent
Hurst, III et al.

(10) Patent No.: US 8,308,242 B2
(45) Date of Patent: *Nov. 13, 2012

(54) FOLD FLAT SEAT ASSEMBLY WITH REARWARD FOLDING MOTION

(75) Inventors: Nelson E. Hurst, III, Westland, MI (US); Robert J. Szybisty, Livonia, MI (US); Jeffrey P. Carroll, West Bloomfield, MI (US); Matthew J. McLaughlin, Chesterfield Township, MI (US); Peter Paul Zeimis, III, Shelby Township, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,849

(22) Filed: Oct. 21, 2011

(65) Prior Publication Data

US 2012/0038193 A1 Feb. 16, 2012

Related U.S. Application Data

(62) Division of application No. 12/516,838, filed as application No. PCT/CA2007/002153 on Dec. 3, 2007, now Pat. No. 8,066,326.

(60) Provisional application No. 60/872,325, filed on Dec. 1, 2006.

(51) Int. Cl.
*B60N 2/00* (2006.01)

(52) U.S. Cl. ............... 297/341; 297/378.12; 297/378.1; 297/334

(58) Field of Classification Search .. 297/378.1–378.12, 297/341
See application file for complete search history.

(56) References Cited

U.S. PATENT DOCUMENTS

| 5,570,931 | A | 11/1996 | Kargilis et al. | |
| 5,588,707 | A | 12/1996 | Bolsworth et al. | |
| 6,070,934 | A * | 6/2000 | Schaefer et al. | 297/14 |
| 6,113,191 | A | 9/2000 | Seibold | |
| 6,199,951 | B1 * | 3/2001 | Zeile et al. | 297/341 |
| 6,347,834 | B1 | 2/2002 | Couasnon | |
| 6,371,558 | B1 | 4/2002 | Couasnon | |
| 6,578,919 | B2 * | 6/2003 | Seibold et al. | 297/331 |
| 7,025,422 | B2 | 4/2006 | Fast | |
| 8,066,326 | B2 * | 11/2011 | Hurst et al. | 297/321 |
| 2005/0057082 | A1 * | 3/2005 | Hatta et al. | 297/341 |
| 2006/0103174 | A1 | 5/2006 | Queveau et al. | |

FOREIGN PATENT DOCUMENTS

| DE | 10355486 A1 | 7/2004 |
| WO | 2007138411 A1 | 12/2007 |

* cited by examiner

*Primary Examiner* — David Dunn
*Assistant Examiner* — Erika Garrett
(74) *Attorney, Agent, or Firm* — Miller Canfield

(57) ABSTRACT

A seat assembly is provided for supporting an occupant above a floor in an automotive vehicle. The seat assembly includes a seat cushion that is adapted to be pivotally coupled to the floor. The seat assembly also includes a seatback that is operatively coupled to the seat cushion for movement between an upright position and a folded position overlying the seat cushion. A linkage system is operatively coupled between the seatback, seat cushion, and the floor. The linkage system automatically moves the seat cushion downwards and forward and translates the seatback downward and rearward in response to movement of the seatback between the upright position and the folded position.

2 Claims, 7 Drawing Sheets

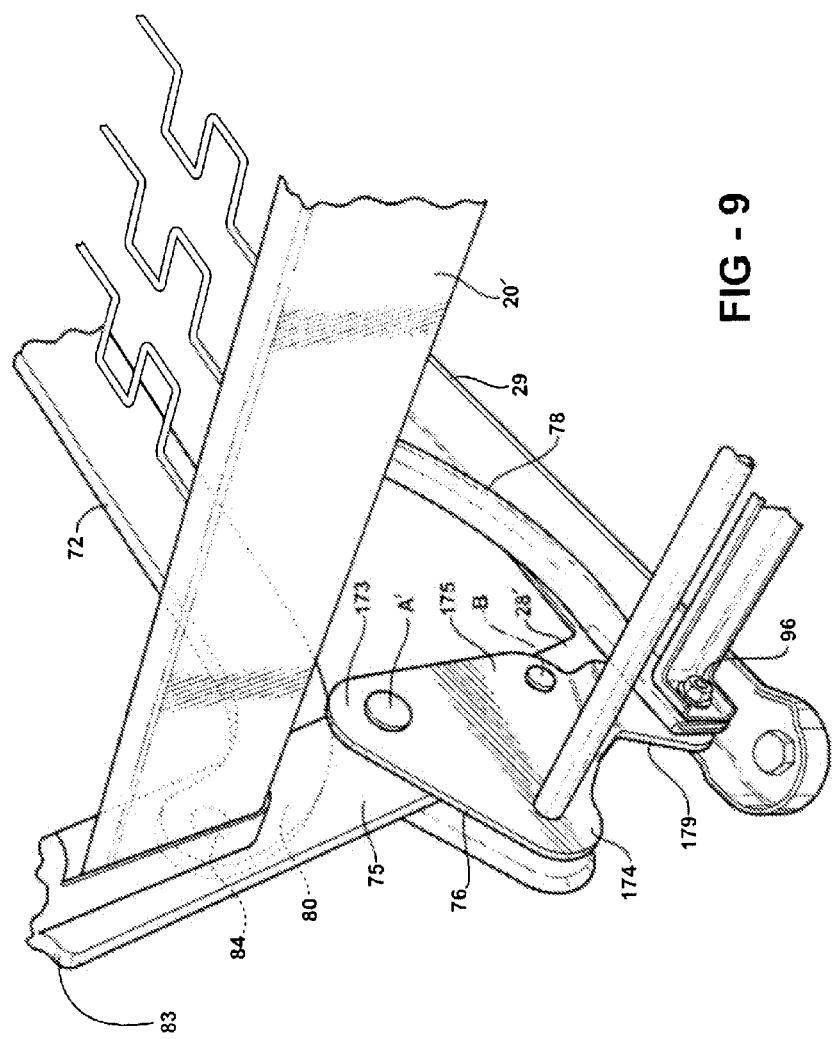

FOLD FLAT SEAT ASSEMBLY WITH REARWARD FOLDING MOTION

CROSS REFERENCE TO RELATED APPLICATION

This application is a divisional application of U.S. patent application Ser. No. 12/516,838, which is a national phase application and claims the benefit, under 35 U.S.C. §371, of PCT/CA2007/002153, filed on Dec. 3, 2007, which in turn claims the priority of United States Provisional Application No. 60/872,325, filed on Dec. 1, 2006. All applications are incorporated herein by reference in their entireties.

BACKGROUND OF THE INVENTION

1. Field of the Invention

The invention relates to a seat assembly for an automotive vehicle. More particularly, the invention relates to a seat assembly having a linkage system for automatically moving a seat cushion downward and forward and translating a seatback downward and rearward in response to pivoting the seatback between an upright position and a folded position.

2. Description of Related Art

Automotive vehicles include one or more seat assemblies for supporting seat occupants within a passenger compartment of the vehicle. Typically, seat assemblies include a generally horizontal seat cushion and a generally vertical seatback. It is well known in the seating art to provide a stowable seat assembly movable between a seating position for supporting the seat occupant above the floor and a stowed position lying flat against the floor, or nested within a recess formed in the floor.

In such stowable seat assemblies, the seatback is normally pivotally coupled to the seat cushion at a seatback pivot located between a lower end of the seatback and a rearward end of the seat cushion. The seatback pivot allows the seatback to pivot between a generally upright position and a folded position overlying the seat cushion. The seat cushion often includes a four-bar-linkage or front and rear legs extending between the seat cushion and the floor of the vehicle for moving the seat cushion between a raised position spaced above the floor and a lowered position resting along the floor. The seatback defines a load floor when the seat assembly is in the stowed position.

When such stowable seat assemblies are in a second or third row, behind a forward seat, an interference condition is often created when folding the seatback forward. Specifically, the seatback cannot pivot between the upright position and the folded position without an upper end of the seatback contacting the forward seat. This interference condition is magnified by federal motor vehicle safety standards, such as FMVSS 202a, which create high seatback height requirements. In addition, with the seatback pivotally coupled to the seat cushion at the seatback pivot, the load floor height is determined by the amount the seat cushion is lowered toward the floor.

It is therefore desirable to provide a mechanism or linkage system which lowers the seatback pivot such that the seatback is at a predetermined load floor height when the seat assembly is in the stowed position. It is also desirable that the linkage system translates the seatback pivot rearward such that the upper end of the seatback clears a forward seat as the seatback moves between the upright position and the folded position. It is further desirable that this motion be done while lowering the seat cushion.

SUMMARY OF THE INVENTION

According to one aspect of the invention, a seat assembly is provided for supporting an occupant above a floor in an automotive vehicle. The seat assembly includes a seat cushion that is adapted to be pivotally coupled to the floor. The seat assembly also includes a seatback that is operatively coupled to the seat cushion for movement between an upright position and a folded position overlying the seat cushion. A linkage system is operatively coupled between the seatback and the seat cushion. The linkage system automatically moves the seat cushion downward and forward and translates the seatback downward and rearward in response to movement of the seatback between the upright position and the folded position.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 9 is a partial perspective view of the second embodiment of the seat assembly.

DETAILED DESCRIPTION OF THE PREFERRED EMBODIMENT

Figure 1:
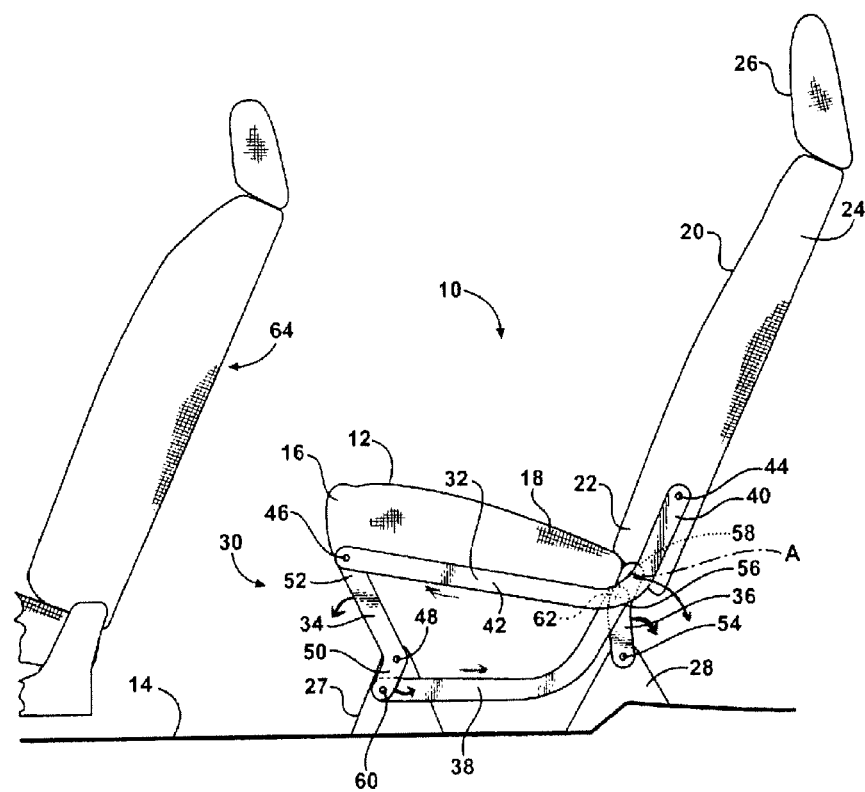
FIG. 1 is a side view of a seat assembly in a seating position including a linkage system according to one embodiment of the invention.
Figure 2:
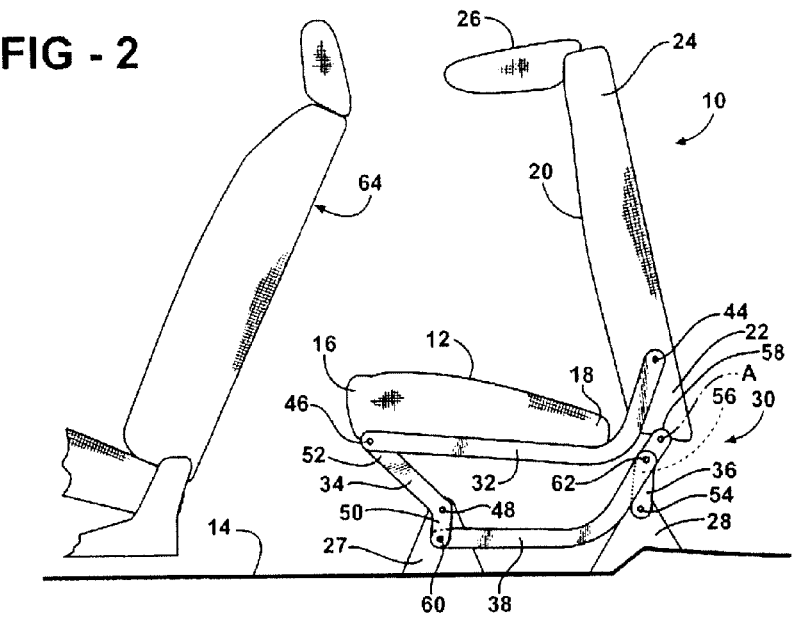
FIG. 2 is a side view of the seat assembly in a first partially folded stowed position.
Figure 3:
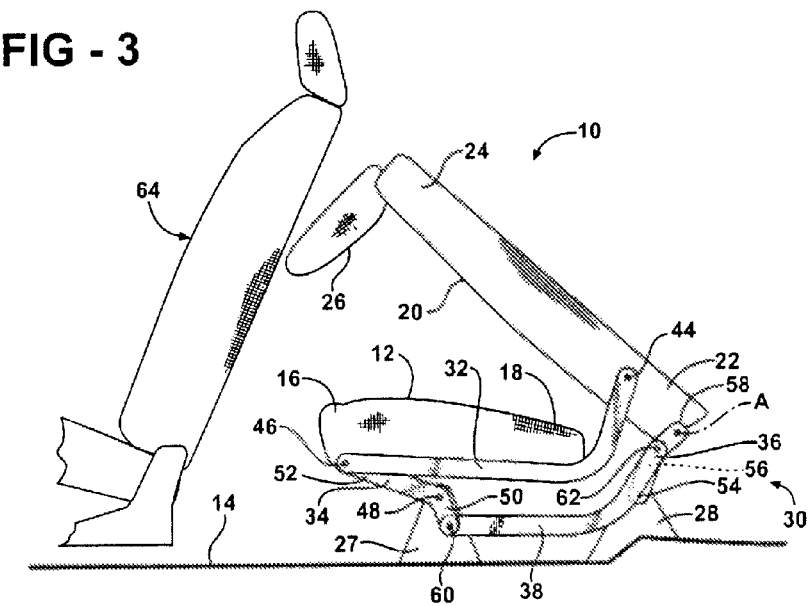
FIG. 3 is side view of the seat assembly in a second partially folded stowed position.
Figure 4:
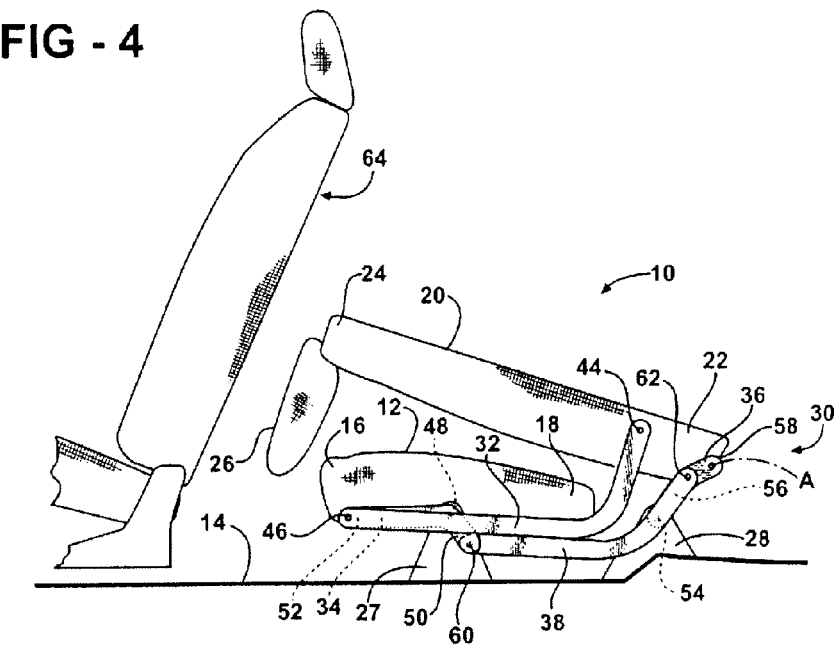
FIG. 4 is a side view of the seat assembly in a third partially folded stowed position.

Referring to FIG. 1, a seat assembly for an automotive vehicle is generally shown at 10. The seat assembly 10 includes a generally horizontal seat cushion 12 for supporting a seat occupant above a floor 14 of the vehicle. The seat cushion 12 extends between a forward end 16 and a rearward end 18. The seat assembly 10 also includes a seatback 20 for supporting a back of the seat occupant. The seatback 20 extends between a lower end 22 and an upper end 24. In the embodiment shown, a head restraint 26 is operatively coupled to the upper end 24 of the seatback 20.

Figure 5:
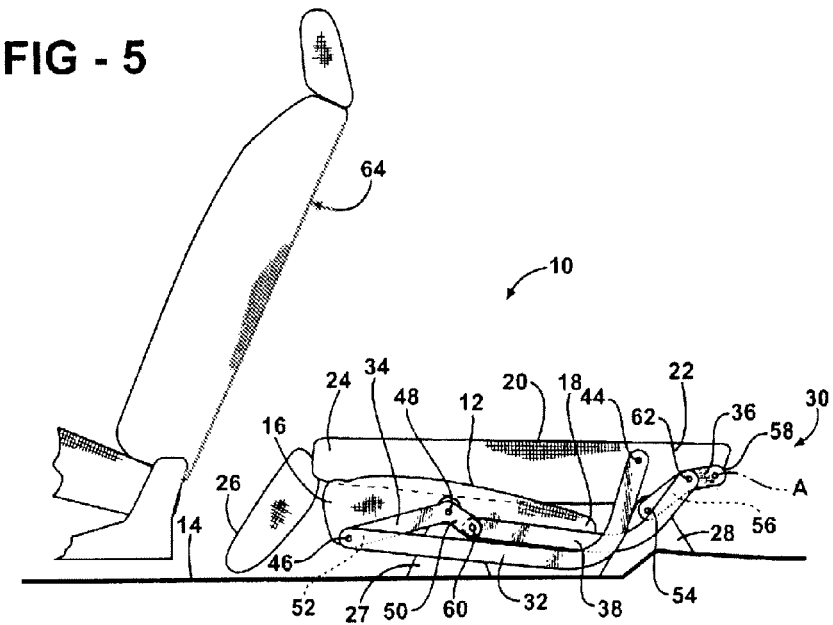
FIG. 5 is a side view of the seat assembly in a folded stowed position.

The seatback 20 is operatively coupled to the seat cushion 12 for movement between a generally upright position, as shown in FIG. 1, and a folded position overlying a seating surface of the seat cushion 12, as shown in FIG. 5. The seat assembly 10 is moveable between a seating position wherein the seatback 20 is in the upright position and the seat cushion 12 is in a raised position spaced above the floor 14, as shown in FIG. 1, and a folded stowed position wherein the seatback 20 is in the folded position and the seat cushion 12 is in a lowered position lying generally along the floor 14, as shown in FIG. 5.

In the embodiment shown, a forward riser 27 and a rearward riser 28 are fixedly secured to the floor 14 for mounting and supporting the seat assembly 10. It will be appreciated that in the alternative the seat assembly 10 may be directly mounted to the floor 14 without varying from the scope of the invention.

Referring to FIGS. 1 through 5, the seat assembly 10 includes a linkage system, generally shown at 30. The linkage system 30 automatically moves the seat cushion 12 between the raised position and the lowered position as the seatback 20 moves between the upright position and the folded position. More specifically, the linkage system 30 moves the seat cushion 12 from the raised position downward and forward to the lowered position, and translates the seatback 20 downward and rearward as the seatback 20 moves from the upright position to the folded position. It will be appreciated that in the alternative the seat assembly 10 may include a pair of spaced apart linkage systems 30 operatively coupled as described in more detail below between the seatback 20, the seat cushion 12, and the floor 14 without varying from the scope of the invention. Therefore, only one side of the seat assembly 10 having the linkage system 30 will be described in detail.

The linkage system 30 includes a seat cushion drive link 32, a front link 34, a rear link 36, and a seatback drive link 38. The seat cushion drive link 32 is generally L-shaped and includes a first linear portion 40 and a second linear portion 42. When the seat assembly 10 is in the seating position the first linear portion 40 of the seat cushion drive link 32 is generally parallel with the seatback 20 and the second linear portion 42 is generally parallel with the seat cushion 12. The seat cushion drive link 32 extends between a first end 44 pivotally coupled to the lower end 22 of the seatback 20 and an opposite second end 46 adjacent to the forward end 16 of the seat cushion 12. The second linear portion 42 is fixedly secured to the seat cushion 12.

The front link 34 is generally L-shaped and extends between a lower end 48 and an upper end 52. The upper end 52 of the front link 34 is pivotally coupled to the second end 46 of the seat cushion drive link 32. The lower end 48 of the front link 34 includes a distal end 50. The lower end 48 is pivotally coupled to an apex of the forward riser 27. Although not shown, it is contemplated that a coil spring may be disposed between the front link 34 and the forward riser 27 for assisting with moving the seat assembly 10 from the folded stowed position to the seating position.

The rear link 36 is generally L-shaped and extends between a lower end 54 and an upper end 56. The upper end 56 includes a distal end 58. The distal end 58 of the rear link 36 is pivotally coupled to the lower end 22 of the seatback 20, below the pivotal connection between the first end 44 of the seat cushion drive link 32 and the seatback 20. The pivotal connection between the distal end 58 of the rear link 36 and the lower end 22 of the seatback 20 defines a seatback pivot axis A about which the seatback 20 pivots. The lower end 54 of the rear link 36 is pivotally coupled to an apex of the rearward riser 28.

The seatback drive link 38 extends between a first end 60 and a second end 62. Preferably, the seatback drive link 38 has a curvature or bend between the first 60 and second 62 ends. The first end 60 of the seatback drive link 38 is pivotally coupled to the distal end 50 of the front link 34. The second end 62 is pivotally coupled to the upper end 56 of the rear link 36, between the lower 54 and distal 58 ends.

The seat assembly 10 further includes a latch mechanism (not shown), of any suitable type commonly known in the art, for controlling the movement of the seat assembly 10 between the seating and stowed positions. The latch mechanism is disposed between the distal end 58 of the rear link 36 and the lower end 22 of the seatback 20. The latch mechanism is operable between a locked state and an unlocked state by actuating a release handle (not shown). In the locked state, the latch mechanism maintains the seatback 20 in the upright position and therefore prevents the seat assembly 10 from moving between the seating and stowed positions. In the unlocked state, the latch mechanism is released to allow the seatback 20 to move between the upright position and the folded position, thereby moving the seat assembly 10 between the seating and stowed positions. It will be appreciated that the latch mechanism may return to the locked state to maintain the seatback 20 in the folded position. Although not shown, it is contemplated that the seat assembly 10 may include seat tracks to provide fore and aft seat adjustment, as is commonly known in the art.

In operation, starting with the seat assembly 10 in the seating position, as shown in FIG. 1, the release handle actuates the latch mechanism to the unlocked state to allow the seatback 20 to pivot forwardly about the seatback pivot axis A. The seat cushion drive link 32 is driven forward by the forward pivotal movement of the seatback 20 which in turn causes the front link 34 to pivot in a counterclockwise direction about the lower end 48 (when viewed from FIGS. 2 through 4). As the front link 34 pivots in the counterclockwise direction, the distal end 50 forces the seatback drive link 38 rearward, which in turn causes the rear link 36 to pivot in a clockwise direction about the lower end 54 (when viewed from FIGS. 2 through 4). The clockwise movement of the rear link 36 translates the location of the seatback pivot axis A downward and rearward until the seat assembly 10 is in the stowed position, as shown in FIG. 5. Thus, in response to movement of the seatback 20 from the upright position to the folded position, the linkage system 30 automatically moves the seat cushion 12 downward and forward while translating the seatback 20 downward and rearward.

In the embodiment shown, the downward and rearward translation of the seatback pivot axis A allows the upper end 24 of the seatback 20, or in this case the head restraint 26, to clear a forward seat, generally indicated at 64, located in front of the stowable seat assembly 10. It will be appreciated that the stowable seat assembly 10 may be any seat within the vehicle without varying from the scope of the invention. In addition, the downward and rearward translation of the seatback pivot axis A establishes a predetermined load floor height.

To return the seat assembly 10 to the seating position, the seatback 20 is pivoted rearwardly about the seatback pivot axis A. The seat cushion drive link 32 is driven rearward by the rearward pivotal movement of the seatback 20, which in turn causes the front link 34 to pivot in the clockwise direction about the lower end 48. As the front link 34 pivots in the clockwise direction, the distal end 50 forces the seatback drive link 38 forward, which in turn causes the rear link 36 to pivot in the counterclockwise direction about the lower end 54. The counterclockwise movement of the rear link 36 translates the location of the seatback pivot axis A upward and forward until the seat assembly 10 is in the seating position, as shown in FIG. 1. Thus, in response to movement of the seatback 20 from the folded position to the upright position, the linkage system 30 automatically moves the seat cushion 12 upward and rearward while translating the seatback 20 upward and forward.

Referring to FIGS. 6 through 9, wherein like primed reference numerals represent similar elements as those described above, in a second embodiment of the invention a seat assembly for an automotive vehicle is generally shown at 10'. The seat assembly 10' includes a generally horizontal seat cushion 12' for supporting a seat occupant above a floor 14' of the vehicle. The seat cushion 12' extends between a forward end 16' and a rearward end 18'. The seat assembly 10' also includes a seatback 20' for supporting a back of the seat occupant. The seatback 20' extends between a lower end 22' and an upper end 24'. In the second embodiment shown, a head restraint 26' is operatively coupled to the upper end 24' of the seatback 20'.

Figure 6:
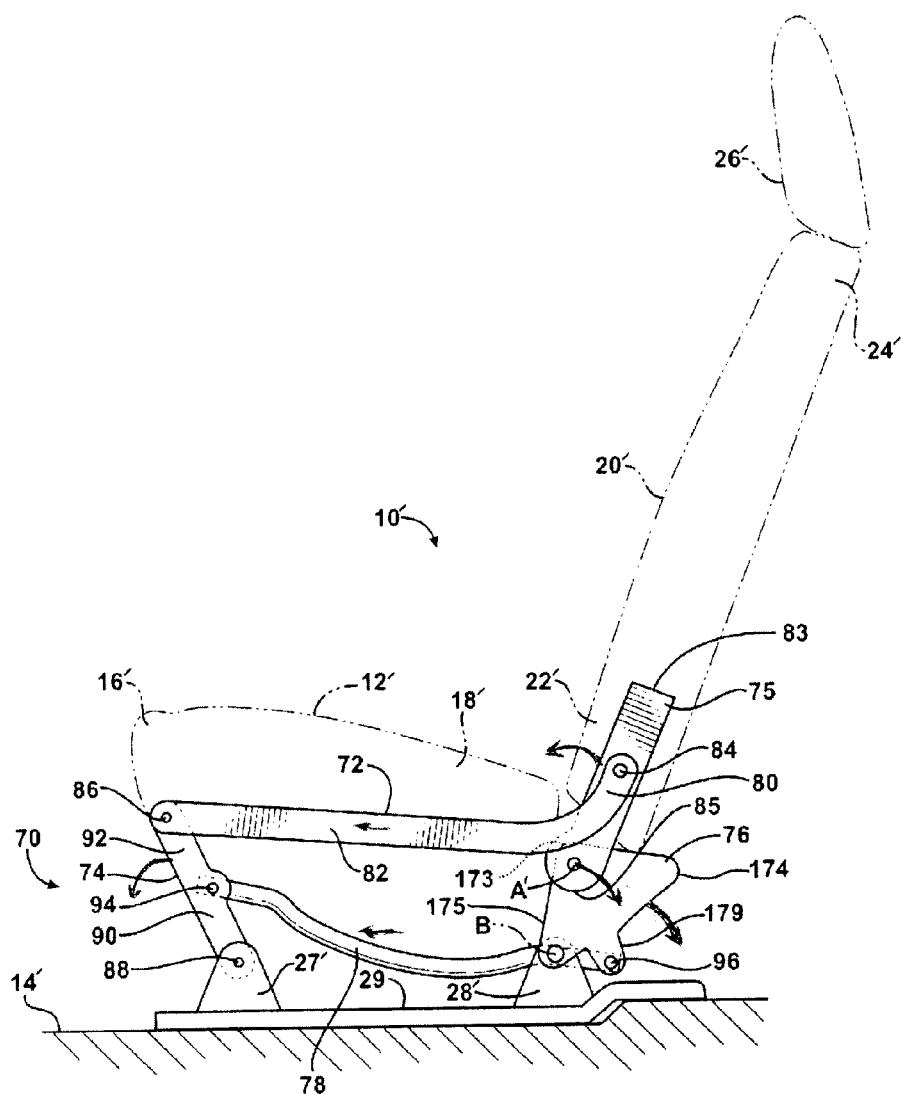
FIG. 6 is a side view of a seat assembly in a seating position including a linkage system according to a second embodiment of the invention.
Figure 7:
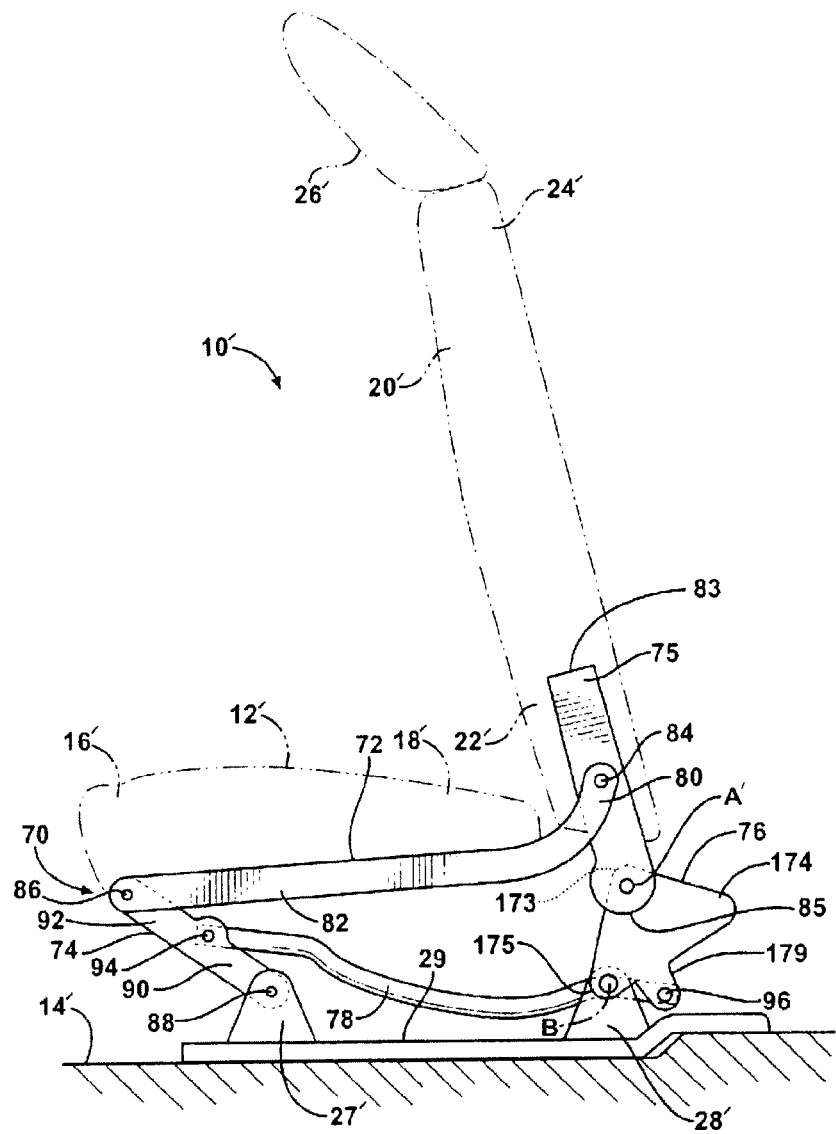
FIG. 7 is a side view of the seat assembly in a partially folded stowed position.
Figure 8:
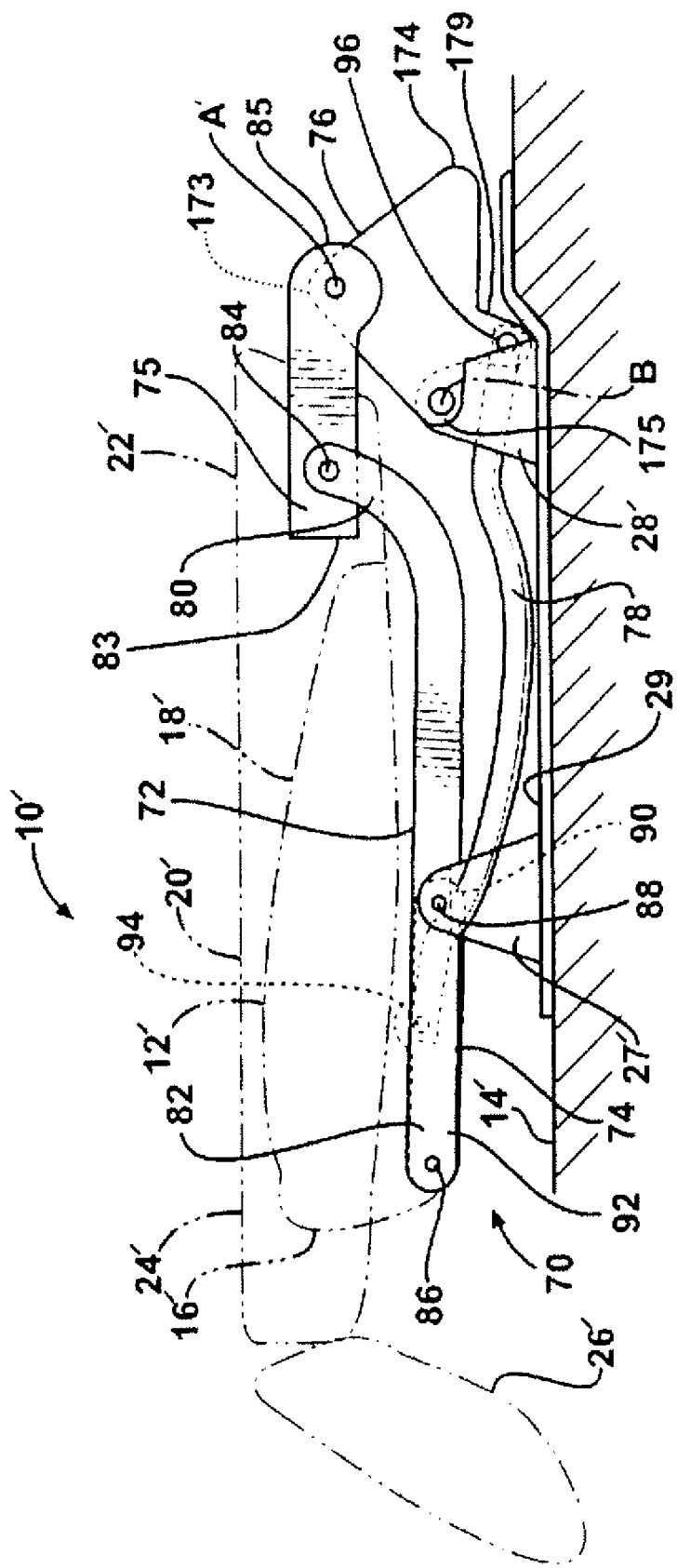
FIG. 8 is a side view of the seat assembly in a folded stowed position.

The seatback 20' is operatively coupled to the seat cushion 12' for movement between a generally upright position, as shown in FIG. 6, and a folded position overlying a seating surface of the seat cushion 12', as shown in FIG. 8. The seat assembly 10' is moveable between a seating position wherein the seatback 20' is in the upright position and the seat cushion 12' is in a raised position spaced above the floor 14', as shown in FIG. 6, and a folded stowed position wherein the seatback 20' is in the folded position and the seat cushion 12' is in a lowered position lying generally along the floor 14', as shown in FIG. 8.

In the second embodiment shown, a forward riser 27', a rearward riser 28', and a floor frame 29 are fixedly secured to the floor 14' by bolting or any other suitable means for mounting and supporting the seat assembly 10'. The floor frame 29 extends vertically upwardly from the vehicle floor 14' and extends horizontally from an end adjacent to the forward riser 27' to an end adjacent to the rearward riser 28'. It will be appreciated that in the alternative the seat assembly 10' may be directly mounted to the floor 14' without varying from the scope of the invention.

The seat assembly 10' includes a linkage system, generally shown at 70. The linkage system 70 automatically moves the seat cushion 12' from a raised position downward and forward to a lowered position, and translates the seatback 20' downward and rearward as the seat back 20' moves from the upright position to the folded position. It will be appreciated that in the alternative the seat assembly 10' may include a pair of spaced apart linkage systems 70 operatively coupled as described in more detail below between the seatback 20', the seat cushion 12', and the floor 14' without varying from the scope of the invention. Therefore, only one side of the seat assembly 10' having the linkage system 70 will be described in detail.

The linkage system 70 includes a seat cushion drive link 72, a front link 74, a seatback link arm 75, a rear connector link 76, and a seatback drive link 78. The seat cushion drive link 72 is generally L-shaped and includes a first portion 80 and a second linear portion 82. When the seat assembly 10' is in the seating position, the first portion 80 of the seat cushion drive link 72 is generally parallel with the seatback 20' and the second linear portion 82 is generally parallel with the seat cushion 12'. The seat cushion drive link 72 extends between a first end 84 pivotally coupled to the link arm 75 and an opposite second end 86. The second linear portion 82 of the seat cushion drive link 72 is fixedly secured to the seat cushion 12'.

The front link 74 is generally linear and extends between a lower end 90 and an upper end 92. The upper end 92 of the front link 74 is pivotally coupled to the second end 86 of the seat cushion drive link 72. The lower end 90 is pivotally coupled to an apex of the forward riser 27'. The pivotal connection between the lower end 90 of the front link 74 and the apex of the forward riser 27' defines a fixed pivot axis 88 about which the front link 74 pivots. Although not shown, it is contemplated that a coil spring may be disposed between the front link 74 and the forward riser 27' for assisting with moving the seat assembly 10' from the stowed position to the seating position.

The seatback link arm 75 is generally linear and extends between an upper end 83 fixedly coupled to the seatback 20' and an opposite lower end 85 pivotally coupled to the rear connector link 76, as is further described below.

The rear connector link 76 is generally triangular-shaped and includes a first corner 173, a second corner 174, and a third corner 175. The first corner 173 is pivotally connected to the lower end 85 of the link arm 75. The pivotal connection between the first corner 173 and the lower end 85 of the link arm 75 defines a pivot axis A' about which the seatback 20' pivots. The third corner 175 is pivotally coupled to an apex of the rearward riser 28'. The pivotal connection between the third corner 175 of the rear connector link 76 and the apex of the rearward riser 28' defines a fixed pivot axis B about which the rear connector link 76 pivots. A distal portion 179 extends from the rear connector link 76 adjacent to the third corner 175. The distal portion 179 is pivotally coupled to the seatback drive link 78 generally at a position below the pivot axis B. The second corner 174 is opposite the third corner 175.

The seatback drive link 78 extends between a first end 94 and a second end 96. Preferably, the seatback drive link 78 has a curvature between the first 94 and second 96 ends. The first end 94 of the seatback drive link 78 is pivotally coupled to the front link 74 between the upper 92 and lower 90 ends of the front link 74. The second end 96 is pivotally coupled to the distal portion 179 of the rear connector link 76.

The seat assembly 10' further includes a latch mechanism (not shown), of any suitable type commonly known in the art, for controlling the movement of the seat assembly 10' between the seating and stowed positions. The latch mechanism is interconnected between the rear connector link 76 and the link arm 75. The latch mechanism is operable between a locked state and an unlocked state by actuating a release handle (not shown). In the locked state, the latch mechanism maintains the seatback 20' in the upright position and therefore prevents the seat assembly 10' from moving between the seating and stowed positions. In the unlocked state, the latch mechanism is released to allow the seatback 20' to move between the upright position and the folded position, thereby moving the seat assembly 10' between the seating and stowed positions. It will be appreciated that the latch mechanism may return to the locked state to maintain the seatback 20' in the folded position.

In operation, starting with the seat assembly 10' in the seating position, as shown in FIG. 6, the release handle actuates the latch mechanism to the unlocked state to allow the seatback 20' to pivot forwardly about the pivot axis A'. The seat cushion drive link 72 is driven forward by the forward pivotal movement of the seatback 20', which in turn causes the front link 74 to pivot in a counterclockwise direction about the pivot axis 88 (when viewed from FIGS. 6 through 7). As the seat cushion drive link 72 is driven forward and the front link 74 pivots in the counterclockwise direction, the seat cushion 12' is translated forward and downward. In addition, as the front link 74 pivots in the counterclockwise direction, the seatback drive link 78 is also driven forward while pivoting about the pivotal connection between the first 94 end of the seatback drive link 78 and the front link 74. The simultaneous forward movement of the seat cushion drive link 72 and the seatback drive link 78 cause the rear connector link 76 to pivot in a clockwise direction about the pivot axis B while the link arm 75 pivots in a counterclockwise direction about the pivot axis A'. The clockwise movement of the rear connector link 76 translates the location of the pivot axis A' of the seatback link arm 75 downward and rearward. Since the link arm 75 is fixedly coupled to the seatback 20', the downward and rearward movement of pivot axis A' translates the movement of the seatback downward and rearward and simultaneously translates the forward moving seat cushion 12' further downward until the seat assembly 10' is in the folded stowed position, as shown in FIG. 8. Thus, in response to movement of the seatback 20' from the upright position to the folded position, the linkage system 70 automatically moves the seat cushion 12' forward and downward while translating the seatback 20' downward and rearward.

In the second embodiment shown, the downward and rearward translation of the seatback 20' allows the upper end 24' of the seatback 20', or in this case the head restraint 26', to clear a forward seat located in front of the stowable seat assembly 10'. It will be appreciated that the stowable seat assembly 10' may be any seat within the vehicle without varying from the scope of the invention. In addition, the forward and downward translation of the seat cushion 12' and the downward and rearward translation of the seatback 20' establish a predetermined load floor height.

To return the seat assembly 10' to the seating position from the folded stowed position, the seatback 20' is pivoted rearwardly about the pivot axis A'. The seat cushion drive link 72 is driven rearward by the rearward pivotal movement of the seatback 20', which in turn causes the front link 74 to pivot in the clockwise direction about the pivot axis 88. As the seat cushion drive link 72 is driven rearward and the front link 74 pivots in the clockwise direction, the seat cushion 12' is translated rearward and upward. In addition, as the front link 74 pivots in the clockwise direction, the seatback drive link 78 is also driven rearward while pivoting about the pivotal connection between the first 94 end of the seatback drive link 78 and the front link 74. The simultaneous rearward movement of the seat cushion drive link 72 and the seatback drive link 78 cause the rear connector link 76 to pivot in a counterclockwise direction about pivot axis B while the link arm 75 pivots in a clockwise direction about the pivot axis A'. The counterclockwise movement of the rear connector link 76 translates the location of the seatback 20' upward and forward and simultaneously translates the rearward moving seat cushion 12' further upward until the seat assembly 10' is in the seating position, as shown in FIG. 6. Thus, in response to movement of the seatback 20' from the folded position to the upright position, the linkage system 70 automatically moves the seat cushion 12' upward and rearward while translating the seatback 20' upward and forward.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant above a floor in an automotive vehicle, said seat assembly comprising:
    a seat cushion adapted to be pivotally coupled to the floor for movement between a raised position spaced above the floor and a lowered position lying against the floor;
    a seatback operatively coupled to said seat cushion for movement between an upright position and a folded position overlying said seat cushion; and
    a linkage system operatively coupled between said seatback and said seat cushion for automatically moving said seat cushion downward and forward and translating a lower portion of said seatback downward and rearward in response to movement of said seatback between said upright position and said folded position, said linkage system including a seatback link arm having an upper end fixedly secured to said seat back and an opposite lower end, a seat cushion drive link extending between a first end pivotally coupled to said upper end of said seatback link arm and a second end fixedly secured to said seat cushion, a front link extending between a lower end adapted to be pivotally coupled to the floor and an upper end pivotally coupled to said second end of said seat cushion drive link, a rear link connector having a first portion pivotally coupled to said lower end of said seatback link arm defining a seatback pivot axis, a second portion opposite said first portion, and a third portion between said first and second portion adapted to be pivotally coupled to the floor for providing pivotal movement of said seat back between said upright position and said folded position, and a seatback drive link extending between a first end pivotally coupled to said front link between said upper and lower ends and a second end pivotally coupled to said second portion of said rear link connector for pivoting said rear link about said third portion thereof and automatically translating said seatback pivot axis downward and rearward in response to movement of said seat cushion from said raised position to said lowered position.

2. A seat assembly as set forth in claim 1 wherein said pivotal connection between said second end of said seat back drive link and said second portion of said rear link connector is spaced below said third portion of said rear link connector to assist the pivotal movement of said rear link connector in response to movement of said seat cushion between said raised and lowered positions and the pivotal movement of said seatback between said upright and folded positions.

* * * * *